United States Patent
Van Den Bossche et al.

(10) Patent No.: US 12,551,110 B2
(45) Date of Patent: Feb. 17, 2026

(54) INVASIVE TEMPERATURE SENSOR SYSTEM

(71) Applicant: ELMEDIX NV, Leuven (BE)

(72) Inventors: Johan Van Den Bossche, Linden (BE); John-Paul Bogers, Boechout (BE); Luigi Brancato, Leuven (BE)

(73) Assignee: ELMEDIX NV, Leuven (BE)

( * ) Notice: Subject to any disclaimer, the term of this patent is extended or adjusted under 35 U.S.C. 154(b) by 756 days.

(21) Appl. No.: 17/780,111

(22) PCT Filed: Dec. 7, 2020

(86) PCT No.: PCT/EP2020/084959
§ 371 (c)(1),
(2) Date: May 26, 2022

(87) PCT Pub. No.: WO2021/111014
PCT Pub. Date: Jun. 10, 2021

(65) Prior Publication Data
US 2023/0000360 A1    Jan. 5, 2023

(30) Foreign Application Priority Data

Dec. 5, 2019 (EP) .................................. 19213934

(51) Int. Cl.
*A61B 5/01* (2006.01)
*A61B 5/00* (2006.01)
*A61B 5/1459* (2006.01)

(52) U.S. Cl.
CPC .............. *A61B 5/01* (2013.01); *A61B 5/1459* (2013.01); *A61B 5/6852* (2013.01); *A61B 2562/0276* (2013.01); *A61B 2562/222* (2013.01)

(58) Field of Classification Search
CPC ....... A61B 5/01; A61B 5/1459; A61B 5/6852; A61B 2562/222
See application file for complete search history.

(56) References Cited

U.S. PATENT DOCUMENTS

| 4,182,313 A | 1/1980 | Aslan |
| 5,916,153 A | 6/1999 | Rhea, Jr. |

(Continued)

FOREIGN PATENT DOCUMENTS

| CN | 104204749 A | 12/2014 |
| EP | 1299044 A1 | 1/2002 |

(Continued)

OTHER PUBLICATIONS

ISR and Written Opinion in corresponding PCT Application No. PCT/EP2020/084959 dated Mar. 18, 2021.

(Continued)

*Primary Examiner* — Daniel L Cerioni
(74) *Attorney, Agent, or Firm* — BACON&THOMAS,PLLC

(57) ABSTRACT

A device for measuring a temperature at one or more locations in an organ or tissue inside the human or animal body, a related kit and a related method. The device includes a catheter tube having a distal end for inserting into the body and a proximal end for remaining outside the body in use of the device, and at least one resistive temperature sensor in the tube, and a plurality of electrical wires in the tube that are connected to the at least one resistive temperature sensor. The plurality of electrical wires includes at least some electrical wires running from the proximal end of the tube through the tube. The device includes a connector at the proximal end of the tube for electrically connecting the plurality of electrical wires to an external device. The (Continued)

resistive temperature sensor includes a thermal resistor and a first terminal and a second terminal.

14 Claims, 3 Drawing Sheets

(56) References Cited

U.S. PATENT DOCUMENTS

| | | | |
|---|---|---|---|
| 6,519,485 B2 | 2/2003 | Wiesmann et al. | |
| 9,289,606 B2 | 3/2016 | Paul et al. | |
| 2002/0072661 A1 | 6/2002 | Wiesmann et al. | |
| 2004/0024347 A1* | 2/2004 | Wilson | A61M 25/0032 |
| | | | 604/22 |
| 2007/0195066 A1* | 8/2007 | Bernitz | G01K 7/186 |
| | | | 374/E7.023 |
| 2011/0034828 A1* | 2/2011 | Holmin | A61B 17/3494 |
| | | | 604/523 |
| 2015/0016487 A1 | 1/2015 | Britton et al. | |
| 2015/0297292 A1* | 10/2015 | Sutermeister | A61M 37/00 |
| | | | 606/41 |
| 2016/0029897 A1 | 2/2016 | Fojtik | |
| 2016/0351292 A1 | 12/2016 | Toth et al. | |
| 2021/0106280 A1* | 4/2021 | Weekamp | A61B 5/6851 |

FOREIGN PATENT DOCUMENTS

| | | |
|---|---|---|
| EP | 1647232 A2 | 4/2006 |
| GB | 2308652 A | 2/1997 |
| JP | H06-501410 A | 2/1994 |
| WO | 2008137795 A1 | 11/2008 |
| WO | 2019151867 A1 | 8/2019 |

OTHER PUBLICATIONS

EP Search Report in corresponding EP Application No. 19213934.3, dated Jun. 16, 2020.
Frederik Ceyssens et al., Extracellular Matrix Proteins as Temporary Coating for Thin-Film Neural Implants, Journal of Neural Engineering, 14 (2017) 014001, pp. 1-9.
First Office Action in corresponding Chinese Patent Appln. 202080084427.8 dated Aug. 31, 2024, with translation.
Office Action cited in corresponding Japanese Patent Appln. 2022-534274 dated Jan. 28, 2025, with 1 translation.

* cited by examiner

INVASIVE TEMPERATURE SENSOR SYSTEM

FIELD OF THE INVENTION

The present invention relates to the field of interventional medical devices, and particularly to sensor catheter devices. The present invention specifically relates to a device for measuring a temperature at one or more locations in the human or animal body, a related kit and/or system, as well as a method of manufacturing such device.

BACKGROUND OF THE INVENTION

In various medical procedures, a need exists for means and methods to accurately monitor a temperature inside the animal or human body. Catheters are commonly used for measuring a property in the body at a specific site. For example, U.S. Pat. No. 5,916,153 discloses a catheter for urethral insertion that comprises a temperature sensor and conductive wires embedded in the catheter wall.

Many catheters known in the art are adapted for transcutaneous use, e.g. intravascular use. However, insertion of such catheter carries a risk of infection, particularly at the tip of the catheter and at the insertion locus where the epidermis is penetrated. Furthermore, in order to minimize the damage to the body and internal organs thereof, a compact configuration and/or a high degree of miniaturization is highly preferred, e.g. such that the sensor arrangement fits in a catheter having a diameter that is preferably as small as reasonably achievable. For example, organs may be highly sensitive to damage due to puncturing. Also, when the catheter is inserted at an angle into the organ, e.g. the entry vector having a substantial tangential component with respect to the exterior organ surface, a further risk exists of tearing or cutting vasculature in the organ. It shall be clear that such puncture wounds, cuts and/or tears are generally to be avoided or at least to be minimized, particularly since such damage may cause potentially life-threatening internal bleeding. These considerations are particularly important for the liver, which is an organ that is particularly sensitive to damage due to its dense vascularization.

In hyperthermia treatments, the temperature of the human or animal body is artificially raised and maintained at an elevated level. While this approach can be used to target cancer cells that are sensitive to heat, the elevated temperature needs to be accurately controlled to avoid damage to the healthy cells. Direct monitoring of the temperature in the body, and particularly in organs that are highly sensitive to overheating, is therefore necessary, or at least desirable, in such procedures. The liver is metabolically very active, such that monitoring the temperature in the liver to prevent overheating is a top priority. It will also be clear that measuring the temperature in multiple locations in the liver may be advantageous. However, as mentioned above, invasively measuring the temperature in the liver also carries a high risk that should be minimized.

It is known in the art to use optical sensing to determine a temperature in the body using a catheter device. For example, GB 2308652 discloses a temperature-sensitive catheter comprising an optic fiber with a grating, in which a dependency of the Bragg wavelength on the temperature is used to measure the temperature. This approach has the additional advantage that multiple Bragg gratings can be coupled to a single fiber at a plurality of locations in the catheter, e.g. by using different grating frequencies. However, even though a compact device can be achieved, this approach may be limited in the measurement accuracy that can be achieved, and other dependencies, such as an influence of strain on the Bragg wavelength, may confound the measurement.

As another example, U.S. Pat. No. 9,289,606 discloses a catheter system for electroporation-mediated therapy, and similar therapy modalities, in which a tip electrode comprises a cavity whose inner surface is impregnated or coated with thermochromic/thermotropic material that changes color with changes in temperature. Thus, the electrode temperature can be monitored by analyzing the spectrum via an optic fiber.

U.S. Pat. No. 6,519,485 discloses a system for assessing organ function. The tip of an optical fiber delivery assembly extends to or into an internal organ and illuminates the tissue. Furthermore, temperature is sensed at the tip, and a collection fiber collects scattered, reflected or emitted light from the surrounding tissue. The intended use of this system is to rapidly detect metabolic changes, e.g. the onset of shock, inside an organ, such as the liver, before these are manifested in blood chemistry, cardiovascular indicators or other health indicators as typically monitored in a hospital setting. The temperature sensor may be embodied, in accordance with this exemplary prior-art disclosure, as an electrically connected sensing element, such as a thermistor, or by a light-based technique, such as infrared thermography.

However, a need still exists in the art to provide means and methods to monitor the temperature in the body, e.g. in an organ. Preferably, the temperature is monitored at a plurality of locations, e.g. spaced along a longitudinal segment of a catheter, e.g. such that local differences in temperature can be detected and/or such that an averaging operation can be performed. As mentioned hereinabove, compact arrangements are highly preferred, e.g. to avoid or minimize damage to the organ.

SUMMARY OF THE INVENTION

It is an objective of the present invention to provide a compact, simple, efficient, cheap and/or safe device for accurately measuring the temperature at one or more locations along an insertion path in the human or animal body, and to provide a method for easily, efficiently and/or reliably manufacturing such device.

Embodiments of the present invention have the advantage that a temperature inside the animal or human body, e.g. in an organ, can be accurately monitored.

Embodiments of the present invention have the advantage that a temperature inside the animal or human body, e.g. in an organ, can be monitored, e.g. at different locations in the organ or tissue of interest, e.g. at a plurality of different depths in a tissue or organ of interest.

Embodiments of the present invention have the advantage that temperature sensors are integrated in a catheter structure to provide a suitable isolation between the foreign matter inserted in the body and the body while a thermal equilibrium between the sensors and surrounding body tissues can be easily and quickly reached.

Embodiments of the present invention have the advantage that a compact structure, e.g. a catheter structure having a small diameter, is provided that advantageously reduces the risk of infection and/or tissue damage due to puncturing, cutting, tearing and/or slashing.

Embodiments of the present invention have the advantage that a soft and/or mechanically compliant (i.e. non-rigid)

structure is provided, e.g. to avoid or reduce tissue damage. For example, the catheter tube may form a soft and/or highly compliant package.

Embodiments of the present invention have the advantage that temperatures can be accurately and safely measured in multiple measurement points in the liver.

Embodiments of the present invention have the advantage that accurate monitoring of temperatures in the body can be achieved, such that, on the basis of these measurements, thermal parameters of a hyperthermia treatment can be controlled to achieve a good treatment efficacy while avoiding potential lethal overheating of the body or of particularly heat-sensitive organs in the body.

Embodiments of the present invention have the advantage that simple and reliable temperature sensors are used, e.g. standard resistance temperature detectors (RTD), such as PT100 or PT1000 sensors. For example, prior art may rely on more complex temperature transduction approaches, e.g. optical detection of temperature dependent optical properties, which may be more prone to errors, less reliable, more expensive, less accurate and/or more difficult to read out and/or to calibrate.

Embodiments of the present invention have the advantage that multiple temperature measurement points can be provided along a sensing region of a catheter, in which at each measurement point a three-wire or four-wire readout method can be used, without requiring as much as three or four wires per measurement point running along the length of the catheter. Since the number of required wires can be kept advantageously low, the diameter of the catheter can also be kept low.

Embodiments of the present invention have the advantage that a reliable temperature measurement in an organ or tissue can be obtained by averaging the temperature measured at a plurality of measurement points.

Embodiments of the present invention have the advantage that a temperature in an organ or tissue can be characterized in detail by determining the temperature at a plurality of measurement points within the organ or tissue.

The above objective is achieved by a device and method in accordance with embodiments of the present invention.

In a first aspect, the present invention relates to a device for measuring a temperature at one or more locations in an organ or tissue inside the human or animal body. The device comprises a catheter tube having a distal end and a proximal end, in which the distal end is adapted for inserting into the body in (or onto) the organ or tissue while the proximal end remains outside the body in use of the device. The device comprises at least one resistive temperature sensor in the tube, and a plurality of electrical wires in the tube that are connected to the at least one resistive temperature sensor. The plurality of electrical wires may comprise at least some electrical wires running from the proximal end of the tube through the tube, and may comprise wire segments running between pairs of the resistive temperature sensors. The device comprises a connector, at the proximal end of the tube, for electrically connecting at least some of the plurality of electrical wires to an external device. The resistive temperature sensor comprises a thermal resistor and a first terminal and a second terminal between which a temperature dependent resistance of the thermal resistor can be measured. Each of the two terminals of each resistive temperature sensor is directly connected (e.g. soldered) to at least one of the plurality of electrical wires.

In a device in accordance with embodiments of the present invention, the electrical wires may be twisted around each other in helices.

In a device in accordance with embodiments of the present invention, the thermal resistor may be a platinum resistor, e.g. a PT100 resistor or a PT1000 resistor.

In a device in accordance with embodiments of the present invention, the resistive temperature sensor may comprise a thin-film substrate.

In a device in accordance with embodiments of the present invention, the thermal resistor may comprise an elongate conductive metal trace arranged in a meandering pattern on the substrate.

In a device in accordance with embodiments of the present invention, the resistive temperature sensor may have a thickness in the range of 50 μm to 150 μm, a width in the range of 100 μm to 700 μm, e.g. in the range of 100 μm to 350 μm, and a length in the range of 1 mm to 10 mm.

In a device in accordance with embodiments of the present invention, the (e.g. each of the) electrical wires may have a diameter in the range of 10 μm to 100 μm, e.g. in the range of 30 μm to 80 μm.

In a device in accordance with embodiments of the present invention, the catheter tube may have an outer diameter in the range of 463 μm to 820 μm and an inner diameter in the range of 260 μm to 514 μm.

In a device in accordance with embodiments of the present invention, the at least one resistive temperature sensor may be a plurality of resistive temperature sensors.

In a device in accordance with embodiments of the present invention, a first plurality of electrical wires (e.g. of said plurality of electrical wires) may connect the plurality of resistive temperature sensors in series such as to let a current run through the plurality of resistive temperature sensors in operation of the device. The first plurality of electrical wires may comprise or consist of:
- a first wire running from the proximal end of the tube to the first terminal of a first resistive temperature sensor in the series,
- a second wire running from the proximal end of the tube to the second terminal of a last resistive temperature sensor in the series, and
- a plurality of wire segments, each connecting the second terminal of a previous resistive temperature sensor in the series to the first terminal of a next resistive temperature sensor in the series. (the 'previous' and the 'next' referring to a pair of adjacent sensors in the series connection)

In a device in accordance with embodiments of the present invention, at least one of the two terminals of each resistive temperature sensor may be directly connected (e.g. soldered) to at least two electrical wires of the plurality of electrical wires that run from the proximal end of the tube, such as to allow the resistive temperature sensor to be read out using a three-wire or a four-wire readout configuration.

In a device in accordance with embodiments of the present invention, a second plurality of electrical wires (e.g. of said plurality of electrical wires), for measuring voltage differences, may run from the proximal end of the tube and may be connected to the plurality of resistive temperature sensors. The second plurality of electrical wires may comprise or consist of:
- a first wire running from the proximal end of the tube to connect to the first terminal of the first resistive temperature sensor in said series,
- a second wire running from the proximal end of the tube to connect to the second terminal of a last resistive temperature sensor in the series, and a plurality of wires running from the proximal end of the tube to connect to respectively each of the wire segments (43).

The first plurality of wires and the second plurality of wires may refer to disjunct sets of wires.

A device in accordance with embodiments of the present invention may comprise a structural wire in the tube to reduce the flexibility of the tube and/or to increase the axial stiffness of the tube, e.g. without substantially increasing its bending stiffness. The structural wire may, advantageously, provide additional strength to the tube and/or may increase the safety when the inserted device is retracted from the body, e.g. preventing that the tube breaks when being pulled back.

In a device in accordance with embodiments of the present invention, the structural wire may be composed of tungsten or a tungsten alloy. In a device in accordance with embodiments of the present invention, the structural wire may comprise, or consist of, stainless steel, e.g. SS 316, carbon fiber, titanium, gold, another metal or metal alloy and/or a polymer fiber. Embodiments are not necessarily limted to these illustrative materials.

In a device in accordance with embodiments of the present invention, the structural wire may have a thickness in the range of 40 µm to 150 µm.

A device in accordance with embodiments of the present invention may comprise one or more filler materials that fills the tube, i.e. that fills the void(s) in the tube not occupied by other device features, e.g. such as to fill otherwise empty spaces in the tube. For example, the one or more filler materials may comprise a deformable filler material. For example, different sections (e.g. separated in the longitudinal direction) may be filled with different filler materials, e.g. having different properties. For example, at least one section may be more flexible than at least one other section, e.g. such that the tube comprises flexible and not flexible (i.e. less flexible or substantially rigid) sections.

A device in accordance with embodiments of the present invention may comprise an integrated circuit for storing data that is operably connected to the connector to provide the data to the external device when connected. The data comprises identification information and/or calibration information and/or sterilization information and/or sensor logging information.

A device in accordance with embodiments of the present invention may comprise at least one optic fiber to deliver a light signal to the organ or tissue, in use of the device, and to collect a return light signal coming from the organ or tissue, such that, in addition to temperature, one or more other physiological parameters of the organ or tissue can be monitored via the optic fiber.

In a second aspect, the present invention relates to a kit comprising a device in accordance with embodiments of the first aspect of the present invention, and one or more selected from:
- a needle for puncturing through the skin,
- a guiding sheath for inserting the tube into the body through a skin puncture,
- a readout device for providing temperature values based on currents and/or voltages measured via the plurality of electrical wires when the readout device is operably connected to the connector.

In a third aspect, the present invention relates to a method for manufacturing a device in accordance with embodiments of the first aspect of the present invention. The method comprises:

- fabricating or obtaining one or more resistive temperature sensors, each resistive temperature sensor comprising an elongate conductive metal trace on a thin-film substrate, the metal trace being arranged in a meandering pattern between a first terminal and a second terminal,
- connecting a plurality of electrical wires to the one or more resistive temperature sensors,
- inserting the one or more resistive temperature sensors and the plurality of electrical wires into a catheter tube such that at least some electrical wires remain accessible at (via) a proximal end of the tube, and
- mechanically connecting a connector to the proximal end of the tube and electrically connecting the connector to the plurality of electrical wires such that an external device can be operably connected to the one or more resistive temperature sensors via the connector.

These and other aspects of the present invention will be apparent from and elucidated with reference to the embodiment(s) described hereinafter.

The present specification and drawings describe specific and preferred features of the invention.

Figure 1:
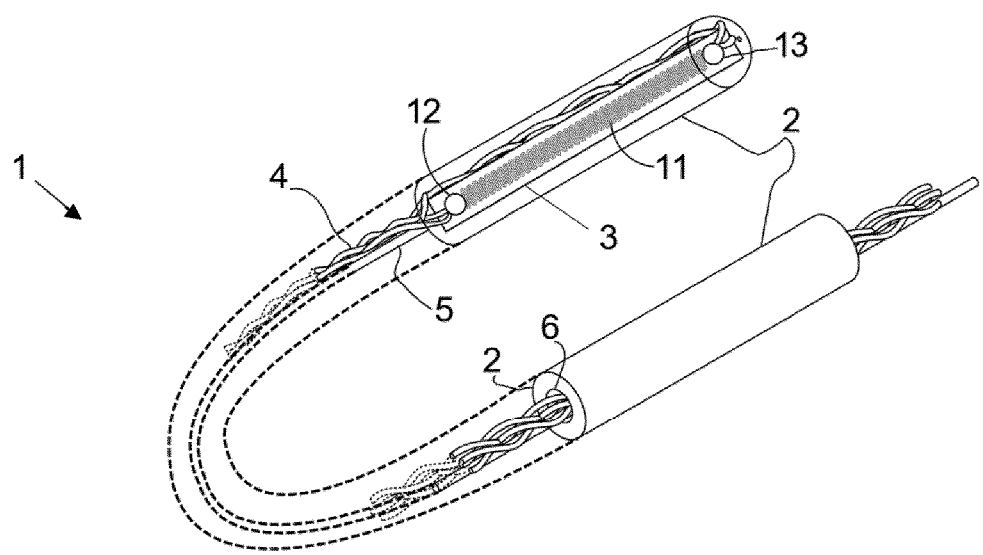
FIG. 1 illustrates a device in accordance with embodiments of the present invention.

The drawings are schematic and non-limiting. Elements in the drawings are not necessarily represented on scale, e.g. an element may be exaggerated for illustrative purposes or reduced in scale to keep the drawing clear and comprehensible. The present invention is not necessarily limited to the specific embodiments of the present invention as shown in the drawings. In different drawings, the same reference signs may refer to the same or analogous elements.

DETAILED DESCRIPTION OF THE INVENTION

The word "comprise," as used in the specification, is not limited to the features, elements or steps as described thereafter, and does not exclude additional features, elements or steps. This therefore specifies the presence of the mentioned features without excluding a further presence or addition of one or more features.

Ordinal references, such as first, second and the like, in the description may be used to discern similar elements and do not necessarily define a sequence, either temporally, spatially, in ranking or in any other manner. Such terms may be interchangeable under appropriate circumstances and embodiments of the invention may relate to other sequences than explicitly described or illustrated herein.

Spatial references, such as top, bottom, on, under and the like, in the description are used for descriptive purposes and not necessarily only for describing relative positions. It shall be clear that embodiments may relate to other positional arrangements of elements described using such spatial references, unless the relative positioning would be necessary for achieving the desired technical effect, i.e. for solving the underlying objective technical problem, as would be evident to the skilled person. Therefore, it is clear that such terms are interchangeable under appropriate circumstances and that embodiments of the present invention may be capable of operation in other orientations than described or illustrated herein.

In this detailed description, various specific details are presented. Embodiments of the present invention can be carried out without these specific details. Furthermore, well-known features, elements and/or steps are not necessarily described in detail for the sake of clarity and conciseness of the present disclosure.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments. References to "embodiments" or "in embodiments" are to be interpreted in the same way.

Various features of the invention may be grouped together in a single embodiment, figure, or description thereof for the purpose of streamlining the disclosure and aiding in the understanding of inventive aspects. This is not to be interpreted as reflecting an intention that the invention requires more features than are expressly recited. Rather, inventive aspects may lie in less than all features of a single foregoing disclosed embodiment as explicitly described.

Furthermore, while some embodiments described herein include some but not other features included in other embodiments, combinations of features of different embodiments are meant to be within the scope of the invention, and form different embodiments, as would be understood by those in the art. For example, any of the embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect, the present invention relates to a device for measuring a temperature at one or more locations in the human or animal body. For example, the device may be adapted for monitoring the temperature of an organ or tissue inside the body.

Figure 2:
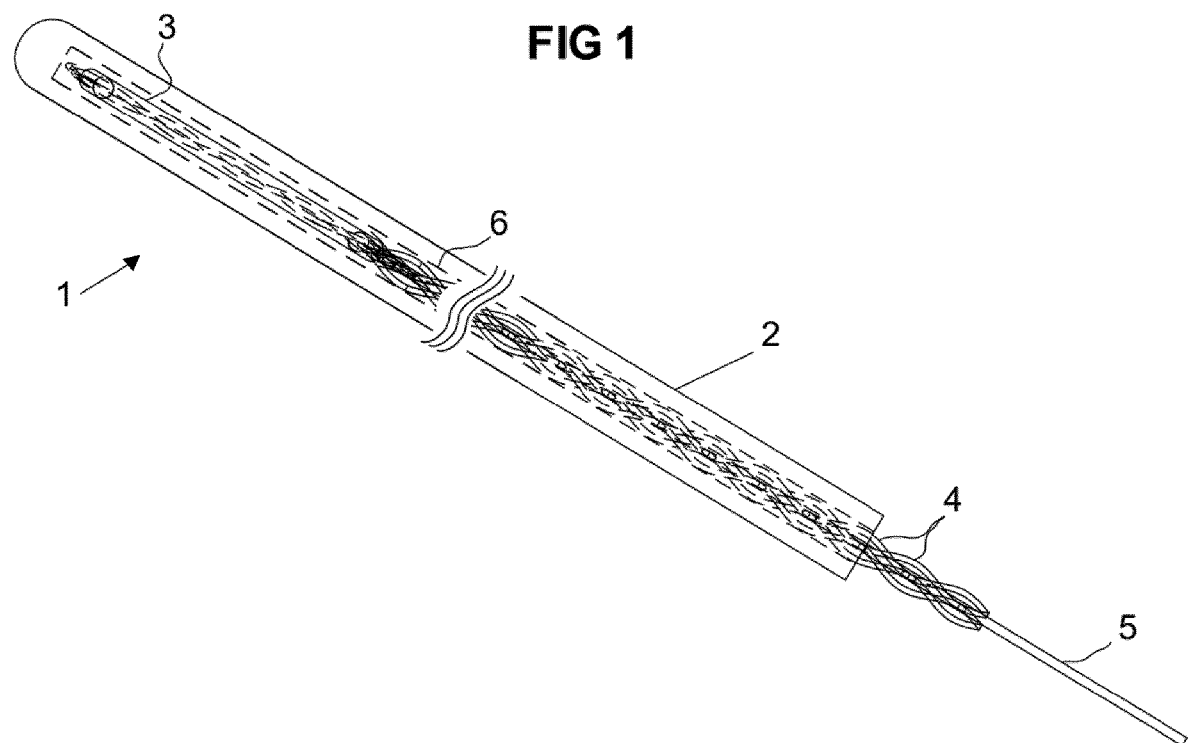
FIG. 2 illustrates a device in accordance with embodiments of the present invention.

FIG. 1 and FIG. 2 show an exemplary device 1 in accordance with embodiments of the present invention.

The device may be, or may comprise, or may be considered as, a catheter. The device comprises a catheter tube 2, particularly a thin tube, e.g. a long, thin and hollow tube, adapted for insertion into the human or animal body, e.g. into the organ of interest.

The catheter tube 2, e.g. an elongate catheter body, typically comprises a central channel (or more accurately, a central channel is formed by the surrounding tube). The catheter tube 2 may comprise a plurality of channels, e.g. such that the device can be used for multiple functions simultaneously (or concomitantly), in which the different functionality is provided by adaptations of the different channels. For example, a further channel may be adapted for injection or extraction of a fluid into the body, to guide an optic fiber for measurements in the body that are mediated (e.g. transduced) by optical phenomena, or the like. However, in a preferred embodiment, the catheter tube 2 comprises a single channel, e.g. may be a cylindrical body (without limitation to other elongate shapes, such as elongate prismatic shapes or having non-uniform cross-sectional shapes; e.g. the flexible catheter may be deformable into many non-standard shapes) without cross-sectional compartmentalization (e.g. radial compartments, angular compartments). The diameter of the catheter tube is preferably as small as achievable, such that implementing multiple channels in the device may be less than optimal. However, depending on the application, the possibility to implement additional functionality may offset the disadvantage of an increased diameter, e.g. particularly when the alternative would be to insert a further catheter into the body.

The tube 2 may have a diameter that corresponds to a Birmingham wire gauge (Stubs steel wire gauge) in the range of 21 G to 26 G, preferably in the range of 22 G to 24 G, e.g. 23 G ("G" merely referring to "Gauge," as conventional in the art, and not to a conventional unit of measurement). In other words, the tube may have a nominal outer diameter in the range of 463 μm to 820 μm, preferably in the range of 717 μm to 566 μm, for example in the range of 0.63 to 0.65 mm (e.g. 641 μm, e.g. 641.4 μm).

The tube 2 has a distal end, which is closed and intended to be inserted into the body, and a proximal end (different from the first end) that is intended to remain outside of the body in normal use of the device, e.g. at which end the tube may interface with a connector. The terms 'distal' and 'proximal' are merely used to distinguish these ends, and not intended to imply any other features other stated.

The tube 2 may consist of, or comprise, a medical grade material, e.g. a medical grade polymer material. Particularly, such medical grade material may be inert, or substantially inert, and unreactive, or substantially unreactive, to body fluids and preferably also to other fluids to which it may be exposed in normal use. The material may comprise a silicone rubber material, a nylon material, a polyurethane material, a polyvinyl chloride material, a polyethylene terephthalate (PET) material, a latex material, and/or a thermoplastic elastomer material. For example, the tube may consist of, or may comprise, silicone, which is advantageously inert and unreactive.

The silicone rubber material may be, or may comprise polydimethylsiloxane (PDMS; also called dimethylpolysiloxane). A suitable biomedical grade elastomer material may be commercially available under the name Dow Corning SILASTIC Q7-4750. Another preferred material may be a polyimide and/or polyurethane. The tube may be specifically treated, e.g. platinum-cured, to improve (enhance) the biomedical compatibility.

The tube may be a composite (or combination) of a plurality of materials, for example a bulk material (e.g. the materials referred to hereinabove), e.g. silicone and/or natural latex, and a coating applied at, at least, the external (exterior; radially outward) surface of the tube. Such coating may consist of, or comprise, for example, polytetrafluoroethylene, and/or a hydrogel and/or a silicon elastomer. The coating may be, or may comprise, a hydrophilic surface coating to create a slippery film layer when wetted, such that the tube can be more easily and more safely inserted in the body.

Generally, the tube material, materials and/or coating(s) may comprise a wide range of materials, e.g. polymeric materials, in so far having a good biocompatibility when exposed to blood and/or interstitial fluids.

The tube may be a flexible tube, e.g. as known in the art for soft catheters. Even if the tube may be considered as flexible, the specific stiffness of the tube may vary across embodiments, e.g. as function of the specific requirements for an intended application. Furthermore, since the tube preferably has a small diameter, e.g. to avoid or reduce potential damage to the body, the stiffness of the tube as such may be less than optimal, which may be increased by a wire and/or a material that fills the tube, as will be explained further hereinbelow. Note that the length of the tube 2 might be substantially longer than what is illustrated in FIG. 1 (as represented by the dashed lines), and that the flexibility of the tube might be exaggerated in the bend as shown.

The device 1 comprises at least one resistive temperature sensor 3, i.e. a temperature sensor that comprises an electrical conductor 11 (further referred to as the thermal resistor 11) having a temperature dependent resistance such that a temperature of the conductor, e.g. presumed to be in thermal equilibrium with its environment, can be determined by measuring the resistance of the electrical conductor. For example, the resistive temperature sensor (or at least one of, e.g. each of, the resistive temperature sensors) may be (or may comprise) a thermistor or a resistance temperature detector (RTD). The (or each) resistive temperature sensor 3 comprises a first terminal 12 and a second terminal 13 (i.e. electrical connection point), between which a temperature dependent resistance can be measured. For example, the terminals 12, 13 may be bond pads, onto which wires may be soldered.

Particularly, the resistive temperature sensor may be (or may comprise) a thermal resistor 11. The thermal resistor 11 may be platinum resistor, e.g. may be composed of platinum or a platinum alloy. The platinum material may be substantially pure, or may be doped to tune the characteristics. It is an advantage of platinum that it has a sufficiently strong and stable (e.g. repeatable) resistance-temperature relationship, which has a good linear behavior near body temperature. Furthermore, platinum is inert in the human body, e.g. is biocompatible and hypoallergenic.

The thermal resistor may have a resistance of about (e.g. at a specific reference temperature and ignoring normal margins of error in fabrication) 1000 Ω(e.g. 1 kΩ). For example, the resistive temperature sensor 3 may be a PT1000 sensor. However, the thermal resistor in accordance with embodiments of the invention may also have a different value, e.g. about 100 Ω(e.g. 0.1 kΩ), or, any value, e.g. in the range of 10 Ω to 10,000 Ω, preferably in the range of 50 Ω to 5 kΩ(at a temperature in the range of interest, e.g. reference body temperature).

The thermal resistor 11 may comprise a conductive, e.g. metal, trace on a substrate. Particularly, in preferred embodiments, the substrate may be a thin film substrate. For example, the thin film substrate may have a thickness in the range of 25 µm to 250 µm, preferably in the range of 75 µm to 125 µm, e.g. about 100 µm.

For example, the thermal resistor may be fabricated using thin-film lithography. Thus, the thermal resistor may be formed by depositing conductive material, e.g. a metal (e.g. platinum), on a thinned down semiconductor substrate, e.g. a thinned silicon wafer, and patterning this into a trace using high resolution photolithographic techniques. For example, the conductive material layer in/from which the resistive element is formed may have a thickness of only 1 nm to 100 nm, e.g. even in the range of 1 nm to 10 nm. The thermal resistor may be fabricated using deep reactive ion etching, e.g. to accurately define the shape of the thermal resistor element. The thermal resistor may be dimensioned (i.e. referring to the thickness, width and length of the substrate on which the resistive element is provided) such as to fit into the tube 2, e.g. a thickness substantially determined by the thickness of a thin film substrate, e.g. 100 µm, and a width in the range of 100 µm to 700 µm, e.g. in the range of 100 µm to 350 µm, e.g. in the range of 150 µm to 250 µm, e.g. 190 µm. The length of the thermal resistor 11 may be substantially determined by the length of the conductive trace needed to achieve a desired resistance. To measure the temperature at a specific location in the body, i.e. to achieve a high spatial resolution of the temperature measurement, the length of the thermal resistor 11 is preferably as short as feasible, in so far still providing a sufficient resistance and temperature dependence. For example, the length (of the substrate) may be in the range of 1 mm to 10 mm, e.g. in the range of 2 mm to 5 mm, e.g. 3 mm.

The thermal resistor 11 may be an elongate (slender; extensive in length) conductor arranged in a meandering pattern, e.g. a square zig-zag pattern as shown in FIG. 1. 'Meandering' refers to following a winding and/or intricate path, e.g. such that the length of the thermal resistor is large in comparison to the area of the convex envelope of the thermal resistor.

For example, the thermal resistor 11 may comprise a thin meandering platinum track of a suitable thickness and a width in the order of 10 µm. Such thin meandering platinum tracks can be fabricated using a lift-off process and physical vapor deposition, for example as described by Ceyssens et al. in "Extracellular matrix proteins as temporary coating for thin-film neural implants," Journal of neural engineering 14.1 (2017): 014001. Furthermore, where in this prior art document polyimide is used as substrate, the same, if not a similar, approach can be applied to thinned-down silicon substrates. For example, a thinned-down silicon substrate may be less flexible than polyimide, which could advantageously improve the stability of the thermal resistor under different mechanical loading conditions.

The thermal resistor may comprise additional biocompatible insulating layers, e.g. oxide, nitrites and/or polymers (e.g. poly(p-xylylene) polymers, such as parylene-C) deposited on the resistor and/or the substrate for passivation and/or electrically isolation, e.g. to prevent a flow of electrical current to the human or animal body. Furthermore, such layer(s) may reduce the amount of water vapor and/or body fluid diffusing through the package to the electrically active device. The layer(s) may also act as a solder mask to prevent reflow of solder on the resistor. Such layer(s) may be deposited by physical vapor deposition, e.g. RF-plasma driven sputtering, atomic layer deposition, chemical vapor deposition, or other suitable techniques known in the art.

The device comprises a plurality of electrical wires 4 (a plurality of leadwires) running from the proximal end of the tube (which is intended to remain outside of the body in normal use of the device) to the at least one resistive temperature sensor 3 through the tube 2 and connected to the at least one resistive temperature sensor 3. The (e.g. each of) electrical wires 4 may be composed of (may comprise) a suitable conductive metal, e.g. a high conductivity metal. The wires may be insulated electrical wires, e.g. may comprise a conductive core material in an electrically insulating sheath material. The electrically insulating sheath (or an additional sheath material) may also be adapted for preventing diffusion of the conductive core material out of the wire. The electrically insulating sheath may comprise (or consist of) polyimide. The wires may be coated with a further material to form an insulating (dielectric) and/or biocompatibility-enhancing layer, e.g. forming a moisture and/or diffusion barrier, such as a poly(p-xylylene) polymer, e.g. parylene-C.

Figure 5:
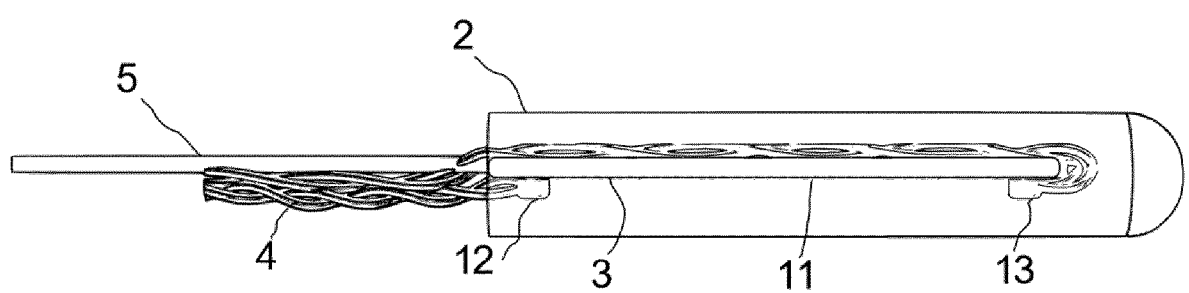
FIG. 5 illustrates a wire configuration approach in a device in accordance with embodiments of the present invention.

Referring to FIG. 5, the electrical wires may be arranged on the backside of the substrate of the temperature sensor(s) 3, i.e. on the side that is opposite of side of the substrate where the thermal resistor is located. In other words, the thermal resistor 11 may be left uncovered by wires, e.g. such as not to interfere with thermal exchange with the surrounding tissue (e.g. via thermal conduction through the tube and optionally a filler material in the tube) and/or to avoid inductive interference with the resistor and/or to protect the thermal resistor (e.g. formed from a thin metal layer) from mechanical damage. It shall be clear that 'arranged on the backside' should be interpreted as 'substantially arranged on the backside', and likewise 'uncovered' as 'substantially uncovered', i.e. may allow for a small area on the frontside where wires connect to the terminals 12, 13.

For example, the wires may comprise copper, gold, platinum, aluminum and/or other suitable metals. It is an advantage of gold and/or platinum (or alloys thereof) wires that a good biocompatibility and medical grade safety can be achieved. It is an advantage of copper (or alloys thereof) wires that a good conductivity can be achieved at a lower cost. The tube material, a coating or sheath of the wire and/or a layer covering the contact points (i.e. where a connection is made between one or more wires and a terminal of a resistive temperature sensor 3) may be adapted to prevent diffusion of wire material (e.g. copper) to the human or animal body when the device is inserted into the body, i.e. to ensure biocompatibility and safety.

The wires of the plurality of electrical wires may have a diameter in the range of 10 µm to 100 µm, e.g. in the range of 30 µm to 80 µm, preferably in the range of 40 µm to 60 µm, such as 49 µm, 50 µm or 51 µm. For example, the (e.g. each) electrical wire may comprise a copper core having a diameter of 45 µm insulated by a sheath layer, e.g. a polyimide layer, having a thickness of 2 µm.

The wires of the plurality of electrical wires are preferably twisted around each other, e.g. loosely wound, e.g. configured as helices around a common axis, to reduce the influence of inductively induced electromagnetic noise, e.g. by virtually zeroing the area between the wires. Furthermore, twisting the wires may also advantageously avoid strain on the wires when the tube is flexed.

Each of the two terminals of the, or each of the, at least one resistive temperature sensor 3 is directly connected, e.g. by a soldered connection, to at least one wire. Preferably, at least one of the two terminals of the, or each of the, at least one resistive temperature sensor 3 may be directly connected, e.g. soldered, to at least two wires, such as to allow the (each) resistive temperature sensor to be read out using a three-wire readout configuration as known in the art. Even more preferred, each of the two terminals of the, or each of the, at least one resistive temperature sensor 3 may be directly connected, e.g. by a soldered connection, to at least two wires, such as to allow the (each) resistive temperature sensor to be read out using a four-wire readout configuration as known in the art. In such four-wire readout technique, a first pair of wires connected to respectively the first and the second terminal of a resistive temperature sensor conducts a current through the resistor, and a corresponding voltage difference over the resistor is measured between a second pair of wires connected to respectively the two terminals.

This advantageously allows a high accuracy measurement of the resistance, and hence the temperature, that is independent of changes in resistance of the wires.

In a three-wire readout configuration of an RTD, as generally known in the art, two wires connect to one terminal of the resistive temperature sensor and a third wire connects to the other terminal of the resistive temperature sensor. In such configuration, the resistances of the three wires may be known to be substantially equal to each other (e.g. having an equal length and same properties such a diameter, conductivity, material, etc.). The total resistance of the sensor, the third wire and the first wire can thus be measured, or, additionally or alternatively, the total resistance of the sensor, the third wire and the second wire. Furthermore, the total resistance of the first wire and the second wire can also be measured, such that the (equal) resistance of the (each) lead wire is known. Therefore, the resistance of the sensor can be determined. This approach allows a compensation for the resistance of the lead wires, but only insofar the resistance of the three wires can be assumed to be equal.

In a four-wire readout configuration of an RTD, as generally known in the art, two wires connect to one terminal of the resistive temperature sensor and two wires connect to the other terminal of the resisitive temperature sensor. One pair of wires (respectively connected to the first and second terminal) can be used to deliver a current (e.g. a constant and known current) used for the measurement, and the other pair of wires can be used to measure the corresponding voltage drop over the resistive sensor.

Figure 3:
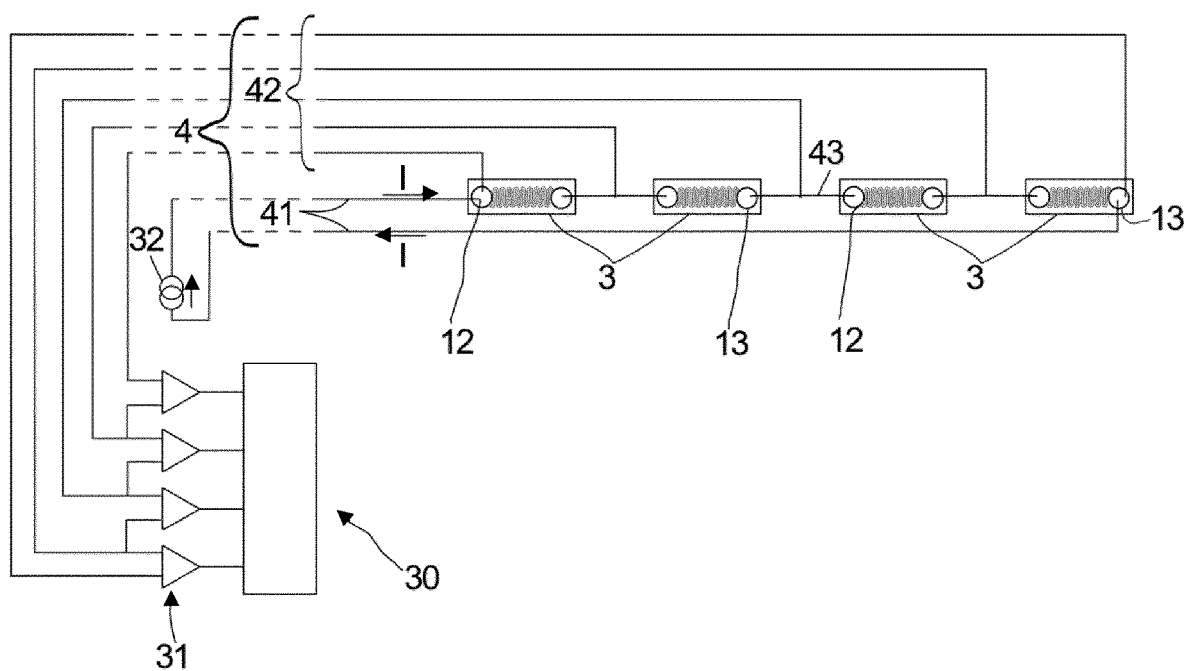
FIG. 3 illustrates a wiring scheme of sensors in a device in accordance with embodiments of the present invention, and an exemplary readout approach in accordance with embodiments of the present invention.

Referring to FIG. 3, the plurality of electrical wires 4 may comprise a first plurality of wires 41, 43 for connecting a plurality of the resistive temperature sensors 3 in series such as to let a current I run through the plurality of resistive temperature sensors 3 in operation of the device. Thus, the first plurality of wires 41, 43 comprises a first wire running from the proximal end of the tube (e.g. from a connector) to the first terminal of a first resistive temperature sensor in the series, a second wire running from the proximal end of the tube (e.g. from a connector) to the second terminal of a last resistive temperature sensor in the series, and a plurality of wire segments 43 each connecting the second terminal of a previous resistive temperature sensor in the series to the first terminal of a next resistive temperature sensor in the series.

Furthermore, the plurality of electrical wires 4 may comprise a second plurality of wires 42 (different from the first plurality of wires) for measuring voltage differences between the pair of terminals of each of the sensors 3. However, in order to reduce to number of wires running through the tube (particularly running simultaneously through any cross-section of the tube), a voltage difference between a second terminal of a sensor and the first terminal of the next sensor connected in series may be ignored. Since the wire segments, referred to hereinabove, for connecting pairs of the sensors in series, may be relatively short, the resistance of these wire segments may be advantageously ignored. Thus, the second plurality of wires 42 may comprise (e.g. consist of) a first wire running from the proximal end of the tube (e.g. from a connector) to the first terminal of a first resistive temperature sensor in the series, a second wire running from the proximal end of the tube (e.g. from a connector) to the second terminal of a last resistive temperature sensor in the series, and a plurality of wires running from the proximal end of the tube (e.g. from a connector) to respectively each of the wire segments 43 (or either one of the terminals that the wire segment connects). Since the distance between adjacent sensors may be negligible in comparison to a longer lead from the proximal end of the tube to the first sensor in the series, this approach may offer an advantageous way to compensate for the resistance of the longer leadwire sections (which possibly may be variable as function of ambient factors such as temperature) while ignoring a potential influence of the shorter wire segments to reduce the total number of wires running through the longer lead-in section of the tube. In other words, a good accuracy can be achieved for n sensors in the tube without requiring 3.n or 4.n wires. For example, in this approach, n+3 wires can suffice to obtain accurate and robust measurements.

Furthermore, the device may comprise a structural wire 5 in the tube 2 (e.g. inside the tube and extending over a substantial portion of the, e.g. the entire, length of the tube) in order to increase the axial stiffness of the device (of the tube), e.g. while substantially preserving its low bending stiffness. The structural wire 5 may provide some rigidity to the tube (i.e. "structural" wire may refer to the wire providing some axial stiffness to the device), while still allowing the tube to be flexed, to some degree. The structural wire may be composed of a metal or metal alloy, e.g. tungsten or a tungsten alloy. For example, the tube 2 may have an outer diameter in the range of 463 μm to 820 μm, e.g. 641 μm, and an inner diameter in the range of 260 μm to 514 μm, e.g. about 310 μm, about 320 μm or about 337 μm. The wall may have a thickness in the range of 102 μm to 283 μm, e.g. 152 μm. For a tube made of (or comprising) medical-grade silicon, the tube may have a negligible stiffness. Therefore, the structural wire 5 may aid in providing some rigidity. For example, the structural wire 5 may have a thickness (diameter) in the range of 40 μm to 150 μm, e.g. in the range of 60 μm to 100 μm, e.g. in the range of 70 μm to 90 μm, e.g. 80 μm. For example, the tube 2 may comprise a medical grade silicone material (e.g. PDMS) and may have an outer diameter of about 640 μm and an inner diameter of about 310 μm, while the structural wire 5 may be a tungsten wire having a diameter of about 80 μm. It was found that this combination provides a good rigidity, i.e. a good balance of flexibility and rigidity, while having a small outer diameter and providing enough interior space to accommodate the sensor(s) and wires.

The electrical wires 4 may be twisted (e.g. loosely coaxially wound) and provided alongside the structural wire, or the electrical wires 4 may be twisted around the structural wire, e.g. the electrical wires forming helices around the structural wire as axis.

The structural wire 5 may be, preferably, composed of a radiopaque (radiodense) material, e.g. such that ionizing radiation, e.g. X-rays, are blocked or at least strongly attenuated. Tungsten (or alloys thereof) may have the advantage of having good elastic properties (Young's modulus, shear modulus, bulk modulus) to provide some rigidity to the device, good radiopacity to allow accurate positioning of the tube and its associated sensor(s) inside the body using X-ray fluoroscopy (e.g. real-time moving images obtained by radiography), and good biocompatibility.

The device 2 may comprise at least one filler material 6 that fills the tube 2 (fills the void inside the tube that is not occupied by other features as described hereinabove). For example, the filler material may comprise a deformable filler material may be a silicone rubber material, a nylon material, a polyurethane material, a polyvinyl chloride material, a polyethylene terephthalate (PET) material, a latex material, and/or a thermoplastic elastomer material. For example, the deformable filter material may consist of, or may comprise, silicone, which is advantageously inert and unreactive. The filler material may be, or may comprise PDMS, and/or polyimide and/or polyurethane. The filler material may consist of, or comprise, a similar or the same material as the material that constitutes the tube 2 (but embodiments are not limited thereto). For example, the filler material may comprise an optically clear low consistency silicone elastomer, such as the MED 6015 product, commercially available from NuSil Technology LLC (USA).

The filler may advantageously ensure that the distance between the one or more temperature sensors in the tube remain fixed, and may provide a good thermal conductivity between the temperature sensor(s) and the surrounding tissue, when the device is inserted in the body. Furthermore, the filler may reduce the flexibility of the tube such that it can be easier inserted into the body, may improve the electrical insulation of components in the device, and/or may improve the biosafety of the device.

Different sections (in the longitudinal direction) of the tube may be filled with different filler materials, e.g. such as to provide a different bending stiffness to the different sections.

Figure 4:
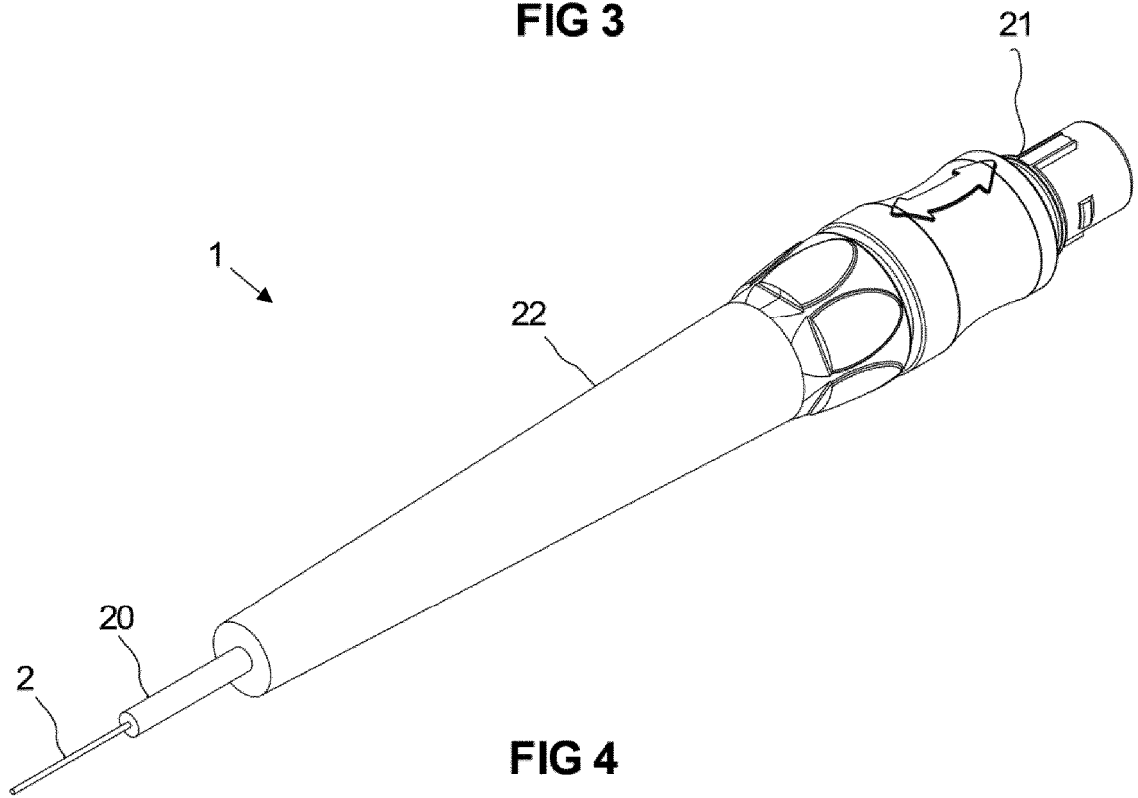
FIG. 4 illustrates a device in accordance with embodiments of the present invention.

Referring to FIG. 4, the device 1 may comprise a further tube 20 in which the tube 2 is inserted and/or through which the tube 2 may be inserted. Thus, this further tube 20 may have a larger diameter and may be more rigid than the tube 2, for example to aid in guiding the tube through a needle puncture.

The device may comprise a connector 21, at the proximal end of the tube, for electrically connecting the plurality of electrical wires 4 to an external readout device 30 for reading out the sensor(s), e.g. a cable mount plug connector. The connector may be a push-pull type connector, i.e. a push-pull cable mount plug. The connector may comprise solder pins, to which the electrical wires are connected (soldered). The connector may be composed of (or may comprise) plastic material(s). Preferably, the connector is resistant to high temperatures, e.g. such as to be suitable for withstanding autoclave sterilization (e.g. pursuant IEC 60601-1). Preferably, the connector is waterproof, e.g. able to withstand fluid ingress in both mated and unmated conditions (e.g. pursuant IP68). Preferably, the connector has a high insulation resistance, e.g. at least 10 MΩ, e.g. at least 100 MΩ. For example, the connector may comprise a circular connector, such as a JMX series connector, commercially available from Souriau SAS (FR), e.g. the 6-pin JMXFH1G06MSUDSU connector. The connector may comprise a push-pull plastic plug with sealing cable gland backshell.

The device 1, e.g. the connector, may also comprise an integrated circuit for storing data, and for providing this data via the connector to the readout device 30 when connected. For example, the integrated circuit may be adapted for storing identification information, such as a unique identification number or tag, and/or calibration information, e.g. for the sensor or for each of the sensors, and/or sterilization information, e.g. to store a time of sterilization and/or parameters used in the sterilization process, e.g. an identification of an operator or device used for sterilization, a sterilization protocol identifier, a sterilization temperature, a sterilization duration and the like. The integrated circuit may also be adapted for storing this information in a writable memory as received from a calibration unit. The integrated circuit (the writable memory) may be a programmable read-only memory (i.e. only once writable), e.g. to protect the integrity of the stored information, even though in other embodiments, other types of memory may also be used, e.g. a flash memory. For example, the integrated circuit may be adapted for logging temperature readings, e.g. to preserve a record of temperature measurements during a procedure, and/or other relevant information, such as manufacturing data, packaging data, sterilization data, and the like.

The connector may comprise a readout circuit 30, e.g. a plurality of operational amplifiers 31 connected in a differential readout arrangement to the second plurality of wires 42, and may provide processed readout data to an external device. However, such readout circuit 30 may also be incorporated in the external readout device instead of in the connector, or the functionality of the readout circuit may be split into a component integrated in the device 1 and a component integrated in an external device.

The device 1 may comprise an over-molded strain relief 22 to relieve stress and/or tension between the (e.g. rigid) connector and the flexible tube 2 and/or further tube 20.

The device 1 may also comprise an optic fiber(s), to deliver a light signal (e.g. provided via the proximal end of the device) to the organ or tissue, e.g. via an transparent section of the tube at the distal end thereof (without limitation thereto), and to collect a return light signal coming from the organ or tissue. The return light signal may be transmitted and/or reflected by the organ or tissue, e.g. refracted, diffracted, attenuated, scattered and/or otherwise changed by interaction with the organ tissue. Thus, in addition to temperature, one or more other physiological parameters of the organ or tissue can be monitored via the optic fiber(s). For example, spectral characteristics of the organ or tissue can be monitored. For example, the one or more other physiological parameters may include oxygenation, e.g. levels of oxygenated and/or deoxygenated hemoglobin. The device may comprise one or more other optic components, such as a grating, a coupler, a microlens, a reflector, a beam splitter, etc., as known in the art.

Embodiments of the present invention may relate to a kit comprising a device 1 as described hereinabove and a needle for puncturing through the skin and/or a guiding sheath for inserting the tube 2 into the body through the skin puncture.

Embodiments of the present invention may relate to a system (e.g. a kit) comprising a device 1 as described hereinabove and a readout device 30 for providing temperature values based on currents and/or voltages measured by means of the plurality of electrical wires 4. The readout device may be adapted for receiving calibration data from the integrated circuit in the device and for taking this calibration data into account when determining temperature values. The readout device may be adapted for periodically determining the temperature values, e.g. to monitor changes of temperatures in the body over time. The readout device 30 may comprise a plurality of operational amplifiers 31 connected, in operation of the device, e.g. via the connector 21, in a differential readout arrangement to the second plurality of wires 42, and may provide processed readout data, e.g. as a digital signal or via a display. The readout device 30 may also comprise a current source 32, e.g. a regulated current source adapted for maintaining a substantially constant current running through the first plurality of wires 41. Other features of such readout device, as known in the art, may be included, as would be obvious to the skilled person, e.g. a readout bridge arrangement, an analog-to-digital converter, digital communication means, a power supply, and/or a user interface.

The system may be, generally, a system for monitoring the function of an organ, e.g. the liver, in the human or animal body, in which the device 1 is adapted for inserting into the organ and collecting data relating to one or more physiological parameters of the organ, including one or more temperatures in the organ. Other physiological parameters may also be monitored, e.g. via an optic fiber(s). For example, the readout device may comprise fiber-optics, a light source (e.g. one or more laser diodes) and/or a photodetector.

In a further aspect, the present invention relates to a method for manufacturing a device in accordance with embodiments of the first aspect of the present invention. The method comprises fabricating or obtaining one or more resistive temperature sensors 3, in which each resistive temperature sensor comprises an elongate conductive metal trace on a thin-film substrate. The metal trace is arranged in a meandering pattern between two electrical connection terminals. The method comprises connecting a plurality of electrical wires 4 to the one or more resistive temperature sensors (3), e.g. via the electrical connection terminals. The method comprises inserting the one or more resistive temperature sensors and the plurality of electrical wires into a catheter tube 2 such that at least some electrical wires remain accessible at a proximal end of the tube. The method comprises mechanically connecting a connector 21 to the proximal end of the tube and electrically connecting the connector to the plurality of electrical wires such that an external device, for reading out the sensor(s), can be operably connected to the one or more resistive temperature sensors via the connector 21. The method may also comprise inserting a structural wire into the tube to decrease its flexibility. The method may also comprise twisting the plurality of electrical wires, possibly around the structural wire (without limitation thereto), in a helical configuration. The method may also comprise filling the tube, after inserting the components in the tube, with a filler material.

Other features, or details of the features described hereinabove, of a method in accordance with embodiments of the present invention shall be clear in view of the description provided hereinabove relating to a device in accordance with embodiments of the present invention, or vice versa.

The invention claimed is:

1. A device for measuring a temperature at one or more locations in an organ or tissue inside the human or animal body, the device comprising:
   a catheter tube having a distal end and a proximal end, in which the distal end is adapted for inserting into the body in or on the organ or tissue while the proximal end is adapted for remaining outside the body in use of the device,
   a plurality of resistive temperature sensors in the tube,
   a plurality of electrical wires in the tube that are connected to the plurality of resistive temperature sensors, and
   a connector, at the proximal end of the tube, for electrically connecting the at least some of the plurality of electrical wires to an external device,
   wherein each of said resistive temperature sensors comprises a thermal resistor and a first terminal and a second terminal between which a temperature dependent resistance of the thermal resistor can be measured, wherein each of the two terminals of the resistive temperature sensor is directly connected to at least one of said plurality of electrical wires, and wherein a number of the plurality of electrical wires in the tube is n+3 wires for n sensors in the tube.

2. The device of claim 1, wherein said electrical wires are twisted around each other in helices.

3. The device of claim 1, wherein said thermal resistor is a platinum resistor, a PT100 resistor or a PT1000 resistor.

4. The device of claim 1, wherein the resistive temperature sensor comprises a thin-film substrate and wherein said thermal resistor is an elongate conductive metal trace arranged in a meandering pattern on said substrate.

5. The device of claim 1, wherein said resistive temperature sensor has a thickness in the range of 50 µm to 150 µm, a width in the range of 100 µm to 700 µm, and a length in the range of 1 mm to 10 mm, wherein said electrical wires have a diameter in the range of 10 µm to 100 µm or in the range of 30 µm to 80 µm, wherein said catheter tube has an outer diameter in the range of 463 µm to 820 µm and an inner diameter in the range of 260 µm to 514 µm.

6. The device of claim 1, wherein a first plurality of electrical wires connects the plurality of resistive temperature sensors in series such as to let a current run through the plurality of resistive temperature sensors in operation of the device, the first plurality of electrical wires comprising or consisting of:
- a first wire running from the proximal end of the tube to the first terminal of a first resistive temperature sensor in the series,
- a second wire running from the proximal end of the tube to the second terminal of a last resistive temperature sensor in the series, and
- a plurality of wire segments each connecting the second terminal of a previous resistive temperature sensor in the series to the first terminal of a next resistive temperature sensor in the series.

7. The device of claim 6, wherein at least one of the two terminals of each resistive temperature sensor is directly connected to at least two electrical wires of the plurality of electrical wires running from the proximal end of the tube such as to allow the resistive temperature sensor to be read out using a three-wire or a four-wire readout configuration.

8. The device of claim 6, wherein a second plurality of electrical wires, for measuring voltage differences, runs from the proximal end of the tube and connects to the plurality of resistive temperature sensors, the second plurality of electrical wires comprising or consisting of:
- a first wire running from the proximal end of the tube to connect to the first terminal of the first resistive temperature sensor in said series,
- a second wire running from the proximal end of the tube to connect to the second terminal of a last resistive temperature sensor in the series, and
- a plurality of wires running from the proximal end of the tube to connect to respectively each of the wire segments or a terminal to which the wire segment is connected.

9. The device of claim 1, comprising a structural wire in the tube to increase the axial stiffness of the tube, and/or a filler material that fills the tube.

10. The device of claim 1, wherein said structural wire is composed of tungsten or a tungsten alloy and/or has a thickness in the range of 40 µm to 150 µm.

11. The device of claim 1, comprising an integrated circuit for storing data, operably connected to the connector to provide said data to the external device when connected, wherein said data comprises identification information and/or calibration information and/or sterilization information and/or sensor logging information.

12. The device of claim 1, further comprising at least one optic fiber to deliver a light signal to the organ or tissue, in use of the device, and to collect a return light signal coming from the organ or tissue, such that, in addition to temperature, one or more other physiological parameters of the organ or tissue can be monitored via the optic fiber.

13. A kit comprising the device of claim 1, and one or more selected from:
- a needle for puncturing through the skin,
- a guiding sheath for inserting the tube into the body through a skin puncture,
- a readout device for providing temperature values based on currents and/or voltages measured by means of the plurality of electrical wires when the readout device is operably connected to the connector.

14. A method for manufacturing a device in accordance with claim 1, the method comprising:
- fabricating or obtaining one or more resistive temperature sensors, each resistive temperature sensor comprising an elongate conductive metal trace on a thin-film substrate, the metal trace being arranged in a meandering pattern between a first terminal and a second terminal,
- connecting a plurality of electrical wires to the one or more resistive temperature sensors,
- inserting the one or more resistive temperature sensors and the plurality of electrical wires into a catheter tube such that at least some electrical wires remain accessible ata proximal end of the tube, and
- mechanically connecting a connector to the proximal end of the tube and electrically connecting the connector to the plurality of electrical wires such that an external device can be operably connected to the one or more resistive temperature sensors via the connector.

* * * * *